Figure 1:
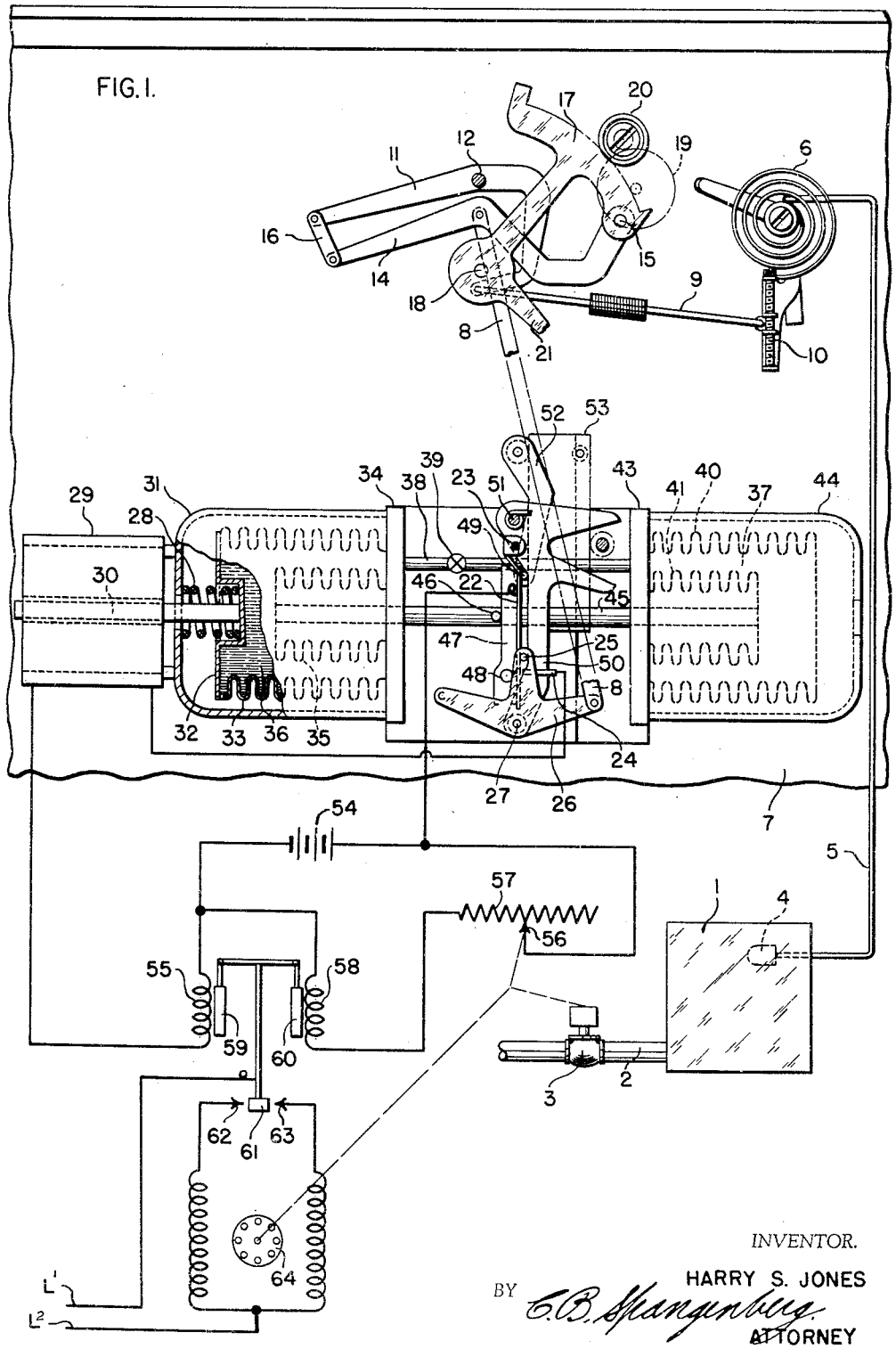

Dec. 7, 1943. H. S. JONES 2,335,943
ELECTRICAL CONTROL SYSTEM
Filed Oct. 16, 1941 4 Sheets-Sheet 1

INVENTOR.
HARRY S. JONES
BY C.B. Spangenberg
ATTORNEY

INVENTOR.
HARRY S. JONES
BY C. O. Spangenberg
ATTORNEY

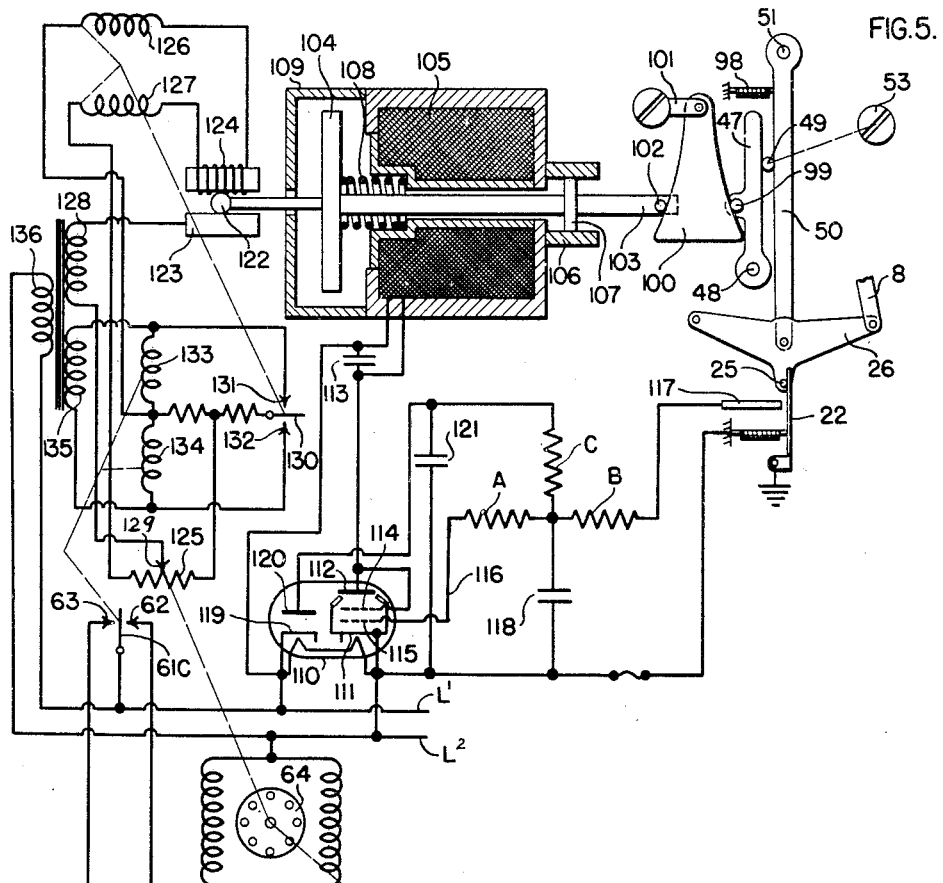
FIG.5.
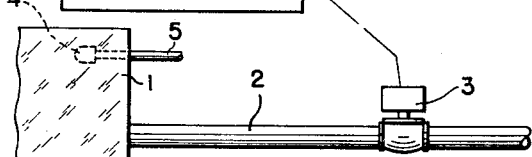
FIG.4.
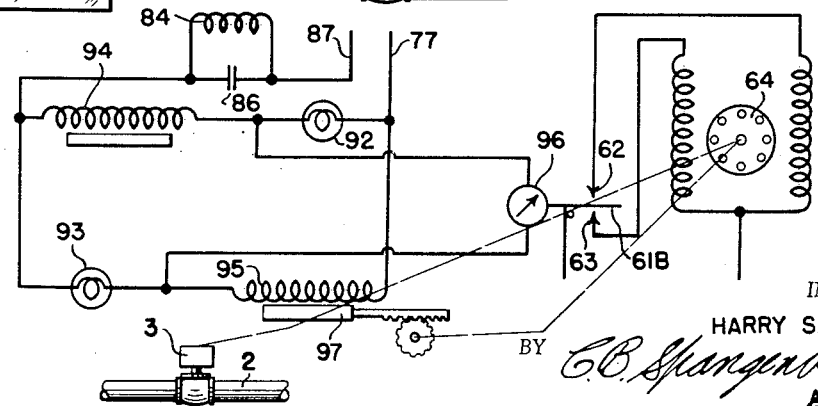
INVENTOR.
HARRY S. JONES
BY C.B. Spangenberg
ATTORNEY Dec. 7, 1943.                H. S. JONES                2,335,943
                      ELECTRICAL CONTROL SYSTEM
               Filed Oct. 16, 1941           4 Sheets-Sheet 4
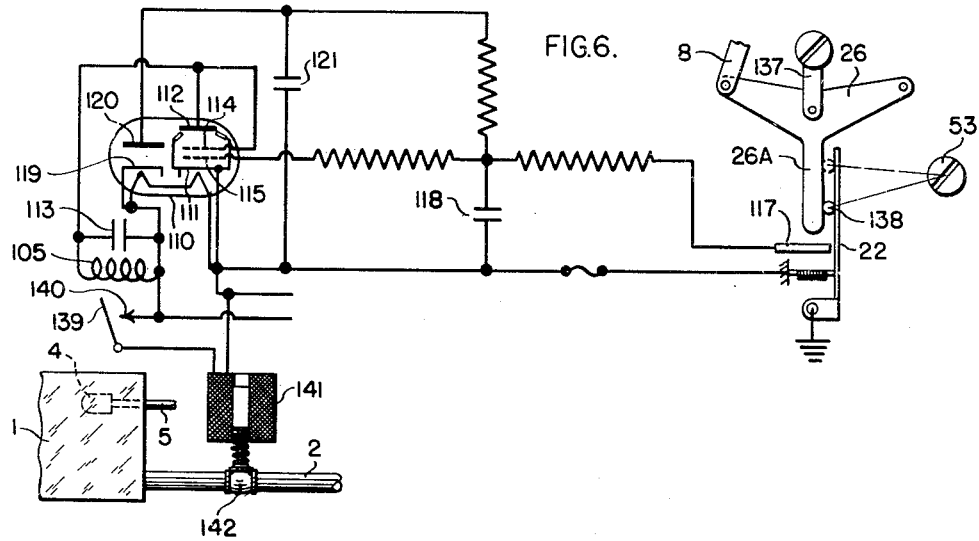
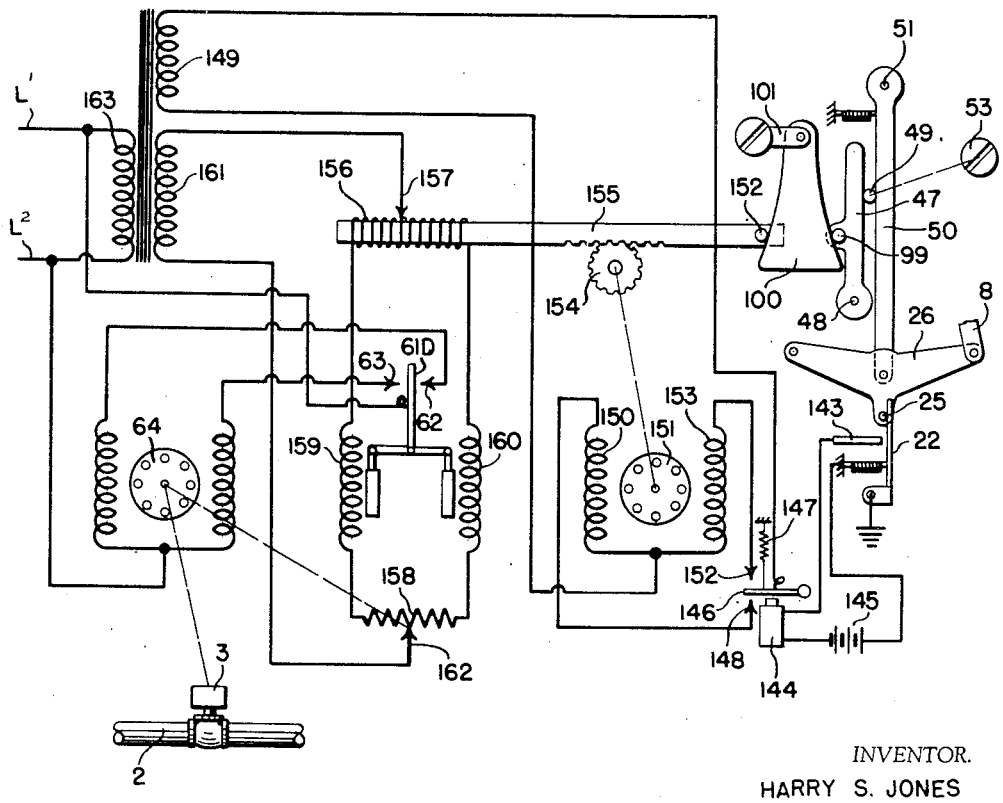
INVENTOR.
HARRY S. JONES
BY *C. B. Spangenberg*
ATTORNEY Patented Dec. 7, 1943

2,335,943

UNITED STATES PATENT OFFICE 2,335,943

ELECTRICAL CONTROL SYSTEM

Harry S. Jones, Washington, D. C., assignor to The Brown Instrument Company, Philadelphia, Pa., a corporation of Pennsylvania Application October 16, 1941, Serial No. 415,253

10 Claims. (Cl. 236—74)

The present invention relates to control instruments and more particularly to electrical control instruments that may be provided with follow-up and/or reset.

In the control of various condition such as temperature, pressure or flow the primary measuring element is made as sensitive as possible in order that it will respond accurately to minute changes in the condition. This usually means that there is very little power produced by the measuring element for the operation of any control apparatus. It is, accordingly, highly desirable that the control mechanism be so constructed that a minimum of power is required to operate it. Furthermore, if the measuring element is very sensitive some auxiliary force must be used to operate the control valve as well as the parts of the control mechanism which serve to provide the follow-up and reset functions of the instrument.

To this end I have developed an electrical control instrument which has a minimum of parts moved directly by the measuring element, each of these parts being very light in weight. It is an object of the invention to provide an electrical control system that may be operated in a positive manner without imposing an appreciable load on the measuring element. It is a further object of the invention to provide an electrical control system that is compact in form and one that is capable of responding quickly and accurately to any changes in the condition being controlled. It is a further object of the invention to provide an electrical control instrument which will quickly bring the value of a condition to some desired point with a minimum of hunting and accurately maintain the condition at that point.

Another object of the invention is to provide a control instrument in which a very small flow of current through a pair of movable contacts may be used to control a large flow of current in a control circuit, whereby there will be no sparking at the contacts.

In carrying out the invention there is employed a light contact member that is moved by the primary measuring element. This contact serves to close or open an electric circuit that may include an electronic amplifier. The electric circuit operates, either directly or through a relay, to set into operation a control motor and the follow-up and reset mechanisms of the system, when the latter are used.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Figure 2:
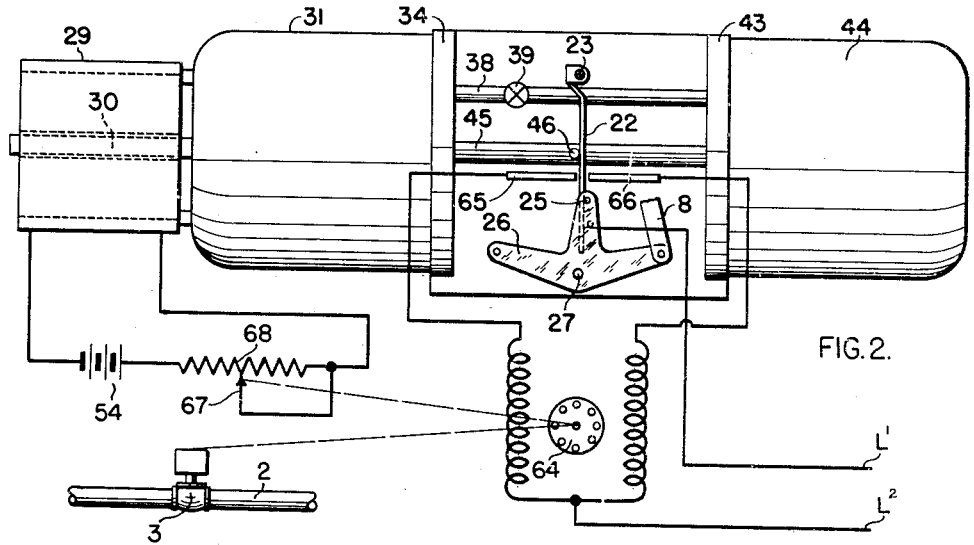
Figure 3:
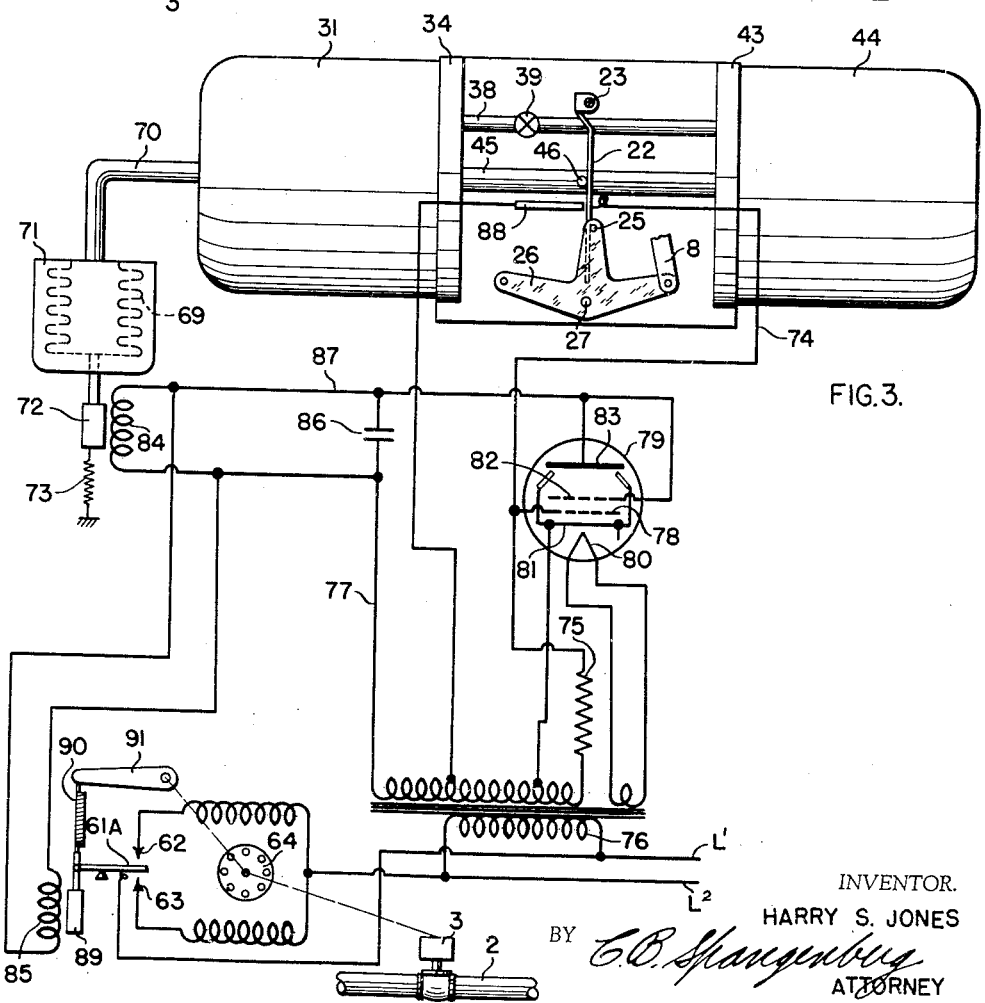

Of the drawings:

Fig. 1 is a view of an instrument embodying one form of control circuit and having a fluid controlled follow-up and reset, Fig. 2 is a view of an instrument using a control circuit different from the one in Figure 1, Fig. 3 is a view of an instrument similar to Figure 1 including a circuit with an electronic amplifier, Fig. 4 is a view of a modified motor control circuit for use with Figure 3, Fig. 5 is a view of an instrument, also having an electronic amplifier, and with an electrical follow-up, Fig. 6 is a view of an instrument having an electronic amplifier and to be used as an on-off controller, and Fig. 7 is a view of an instrument for proportional control and having a reversible motor follow-up.

Referring first to Fig. 1 wherein one form of my invention is shown, by way of example, as controlling the temperature of a furnace 1 that is supplied with some temperature changing fluid through a pipe 2, the flow of which is regulated by a motor driven valve 3. The temperature of the furnace is measured by a bulb 4 which is filled with a temperature responsive liquid and which is connected by a capillary 5 to one end of a Bourdon tube 6 that is mounted in an instrument casing, a portion of which is shown at 7. As the temperature of the furnace varies the outer end of the Bourdon tube will move to the right or to the left and through a lever mechanism, presently to be described, will serve to raise or lower the link 8.

Movement of the outer end of the Bourdon tube 6 is imparted to a link 9, through a connection 10, to the bell crank lever 11 that is in turn fastened to a pivoted shaft 12. As the lever moves around the shaft 12 it moves one end of a floating lever 14 that is pivoted at 15 and connected to the lever 11 by a link 16. As the Bourdon tube expands and contracts the link 8 is raised and lowered.

The control point of the instrument, or the temperature which the instrument will tend to maintain in the furnace 1, can readily be varied by moving the right hand end of the lever 14. This is accomplished by raising and lowering the pivot point 15 that is attached to a lever 17, pivoted at 18. The right arcuate edge of the lever 17 is provided with gear teeth that are driven through a gear train 19 from a knob 20. Therefore, as the knob is rotated the lever 17 will move pivot 15 upwardly and downwardly to impart the same type of movement to the link 8 that is imparted to it by the Bourdon tube. The lever 17 is provided with a pointer 21 which serves to cooperate with a chart, not shown, to indicate the control point of the instrument. There may also be mounted on the shaft 12 a pen and pen arm, not shown, to cooperate with the chart in order to produce a record of the value of the temperature of the furnace 1.

Lengthwise movement of the link 8 serves to move a contact 22 around its pivot 23 into and out of engagement with a stationary contact 24. This is accomplished by means of a pin 25 which extends from one arm of a lever 26 into the path of movement of the contact 22. The lever 26 is pivoted at 27 and has the lower end of link 8 attached to one of its arms. Contact 22 is normally biased in a counter-clockwise direction.

The contacts 22 and 24 may also be moved relative to each other in one direction by the action of a spring 28 and in the other direction by the action of a solenoid 29 on its core 30. To this end a solenoid is attached to the outside of a cup shaped casing member 31 against the inside of which the left end of the spring 28 bears. The right end of the spring 28 bears against a socket formed in a plate 32 that serves as the end wall of a bellows 33 whose open end is attached to a support 34 along with the open end of the member 31. Also attached to this support 34 is one end of a bellows 35 which serves to form, with the bellows 33, a chamber 36. This chamber is in communication with a similar chamber 37 by means of a pipe 38 that is provided with an adjustable restriction 39. The chamber 38 is formed of a large bellows 40 and a small bellows 41 that are attached to a support 43 and which are in opposing relation with the bellows 33 and 35 respectively. The bellows 40 is protected by a cup shaped casing member 44 similar to the member 31. Each of the chambers 36 and 37 along with the pipe 38 are filled with a liquid that can move back and forth between the two at a rate depending upon the adjustment of the restriction 39.

The inner ends of bellows 35 and 41 are joined by a rod 45 that is provided with a projection 46. This projection bears against the left edge of a lever 47 pivoted at 48. The right edge of the lever 47 acts through pin 49 on a lever 50 that is supported for movement at its upper end around a pin 51, and which supports on its lower end the lever 26. The amount of movement imparted to the lever 50 for a given movement of the lever 47 can be varied by raising and lowering the pin 49 which is mounted on the lower end of lever 52. This lever 52 is pivoted to a movable support 53.

The contacts 22 and 24 form part of a circuit including a source of electric current 54, solenoid 29 and a solenoid 55. Another circuit forms part of the control system and includes the source of current 54, a slideable contact 56 which is movable along the resistance 57 and a solenoid 58. Cores 59 and 60 of the solenoids 55 and 58 respectively serve, upon changes in energization of these two solenoids, to move a contact 61 into engagement with either a stationary contact 62 or a stationary contact 63. Engagement of the contact 61 with either of the other contacts energizes a reversible motor 64 for rotation in one direction or the other. This motor is supplied with current through the lines $L^1$ and $L^2$. As the motor rotates it adjusts the opening of valve 3 and simultaneously shifts the contact 56 along the resistance 57.

In a description of this operation of this instrument the various parts will be described as if they moved sequentially, but it must be remembered that the movements of the various parts take place continuously and contemporaneously so that the control impulse set up by the instrument as a result of a change in the value of the condition being measured is almost immediately applied to the control valve. For purposes of description it may be assumed that the temperature of the furnace 4 has increased so that the valve 3 should be closed to supply a smaller amount of the temperature varying fluid through the pipe 2. As the temperature of the furnace increases the outer free end of the Bourdon tube will move toward the right and acting through link 9 and levers 11 and 14, will move the link 8 downwardly. This movement will cause the pin 25 to move to the right away from the contact 22 and that contact will move under normal bias into engagement with the contact 24. A circuit will, therefore, be closed through the two contacts, the battery 54, solenoid 55 and solenoid 29. This operation produces two results; the first of which energizes the solenoid 55 so that the core 59 will be moved downwardly and the contact 61 will be brought into engagement with the contact 63. This energizes the motor 64 for rotation in a direction to close the valve 3 and to simultaneously move the contact 56 to the left along resistance 57. The movement of the contact 56 cuts some of the resistance 57 out of the circuit and, therefore, produces a greater energization of the solenoid 58. This continues until the solenoid is sufficiently energized to move contacts 61 and 63 out of engagement with each other to stop motor 64 and the adjustment of the valve 3. The second result of the engagement of contacts 22 and 24 is to energize the solenoid 29. This produces a movement of the core 30 to the left against the force of spring 28 to elongate bellows 33 and, through the liquid in chamber 36, elongate bellows 35. As the bellows 35 is elongated it moves rod 45 to the left and pin 46 acting through levers 47 and 50 serves to move the pin 25 to the left to disengage contacts 22 and 24. This follow-up movement is provided to prevent over-correction of the temperature. Due to the fact that the liquid in chamber 37 is under greater compression than that in chamber 36, it will tend to flow through the pipe 38 at a rate depending upon the adjustment of restriction 39. This will permit the bellows 35 to contract and the bellows 41 to elongate to their normal lengths and will permit the pin 46 to return to its initial position. Such action more or less cancels out the effect of the follow-up movement of the contact 22. This action is known as reset and serves to compensate for load changes in the furnace 1 by bringing the contact 22 back to substantially its original position with a different opening of the valve 3.

If the temperature of the furnace had decreased the contact 22 would have been moved out of engagement with the contact 24 to deenergize the solenoid 55. The pull of solenoid 58 on its core 60 would then move contact 61 into engagement with contact 62. This will energize the motor 64 for rotation in direction to open valve 3 and shift contact 56 to the right to insert more of resistance 57 in the circuit until the pull of solenoid 55 equals that of solenoid 58. When this occurs the motor circuit will be opened. The same movement of contact 22 toward the left deenergizes solenoid 29 so that spring 28 can move the mechanism controlled thereby to the right. The spring 28 thus serves to provide the follow-up movement and to bring contacts 22 and 24 into engagement again.

The operation is such that the contacts 22 and 24 are continually moved into and out of engagement with each other so that there is an average excitation value of solenoids 29 and 55. This average is decreased or increased depending upon whether the temperature of the furnace 1 has increased or decreased respectively and, therefore, an adjustment of the valve 3 is procured.

It will be seen that the only parts actually moved as a result of movement of the Bourdon tube are very light levers connecting that tube to the lever 26. These serve to move the contact 22 which carries a very small current and which is freely mounted on its pivot. As a result of this, contacts in a second circuit carrying a larger current are immediately closed so that a response of the motor 64 to changes of temperature in the furnace is practically instantaneous and, due to the follow-up in the lever system, there is no tendency for cycling around the control point to occur. This quick operation of the mechanism with a practically negligible load on the Bourdon tube gives a highly effective and sensitive control system.

The system shown in Fig. 2 is substantially the same as that disclosed in Fig. 1 except that in this case the motor 64 is operated directly from movement of the contact 22. With this embodiment of the invention as the temperature of the furnace decreases contact 22 will be moved into engagement with a stationary contact 65 and as the temperature increases the contact 22 will be moved into engagement with a second stationary contact 66. These contacts 65 and 66 are directly connected in the field circuits of the motor 64. As the motor rotates it will adjust the valve 3 in a manner previously described and will simultaneously shift a contact 67 along a variable resistance 68 to either increase or decrease the energization of the solenoid 29 as the case may be, in order that a proper follow-up action may be imparted to the contact 22. If, for example, 22 moved into engagement with contact 65 then the energization of solenoid 29 should be decreased in order for the spring 28 to shift the parts in a direction to separate the contacts 22 and 65. On the other hand, if 22 should move into engagement with contact 66 the energization of 29 should be increased to move core 30 against the force of the spring 28 so that the rod 45 and projection 46 will move to the left to permit separation of the two contacts.

It will be seen that in this embodiment of the invention there is shown a means to close an electrical circuit in response to a deviation in the value of the condition being controlled and to have these circuits acts without any further load upon the measuring element to operate both the control valve and to give follow-up and reset action to the movable contact. This embodiment of the invention differs from that of Figure 1 in that the contact 22 is not being continually moved. In this figure the contact 22 is moved into engagement with either 65 or 66 when the condition changes and is moved back to its neutral position by the follow-up mechanism. In Figure 1 either solenoid 29 or spring 28 was continually acting on the apparatus, while in Figure 2 solenoid 29 and spring 28 can be made to balance each other by properly adjusting contact 67 along resistance 68.

In Figure 3 there is shown an embodiment of the invention using an electronic type of amplifier. There is also shown a slightly different mechanism for obtaining the follow-up and reset movements of the contact 22. In this embodiment the space between the cup-shaped member 31 and the bellows 32 is filled with liquid and the space is placed in communication with the interior of a bellows 69 by a pipe 70. The bellows is protected by a casing 71 and has attached to its movable lower end a solenoid core 72. This core, along with the bellows bottom wall, is urged downwardly by a spring 73.

In this case the contact 22 is connected by a wire 74 with a resistance 75 and a tap on the secondary coil of a transformer 76. The primary of the transformer is connected to a suitable power line indicated by lines L and L². Wire 74 is also connected with the control grid 78 of an electronic tube 79. This tube is provided with a heating filament 80 that is connected to a separate, small transformer secondary. The tube is also provided with a cathode 81 that is connected to the transformer, a screen grid 82 and an anode or plate 83. The screen grid and plate are connected together and by wire 87 to two solenoids 84 and 85 that are in parallel with each other and in series with the plate. The other sides of the solenoid are connected by wire 77 to a tap on the transformer secondary. The solenoids 84 and 85 are shunted by a condenser 86. The contact 22 is adapted to move into and out of engagement with a stationary contact 88 that is directly connected with another tap on the transformer.

Control motor 64 is adapted to be energized for rotation in one direction or the other by engagement of a contact 61A with one of the contacts 62 or 63. Contact 61A is adapted to be moved around its pivot in a counterclockwise direction into engagement with the contact 62 by a core 89 of solenoid 85 but is normally biased in a clockwise direction by a spring 90. The upper end of spring 90 is connected to an arm 91 that is driven by the motor to change the tension of the spring as the control valve 3 is being adjusted.

In describing the operation of this embodiment of the invention it may be assumed that the left end of the secondary winding of transformer 76 is more positive than the right end, as will occur once each cycle of the current. At this time if contacts 22 and 88 are separated the control grid is more negative than the cathode 81 so that no flow of electrons can take place from cathode to plate 83. Therefore the circuit through solenoids 84 and 85 is open. When there is, for example, a decrease in the temperature of the furnace 1 the various parts of the instrument will move to bring contact 22 into engagement with the contact 88. This will complete a circuit from the right end of the transformer secondary through resistance 75, wire 74, contacts 22 and 88 back to the transformer winding. The effect of this is to make the potential of the control grid more positive with respect to the cathode so that current may flow through the tube 79 and energize solenoids 84 and 85.

Energization of the solenoid 84 will serve to move its core 72 upwardly against the force of spring 73 to compress bellows 69 and the fluid in it, pipe 70 and the chamber formed between member 31 and bellows 33. This operates through the mechanism described in detail in connection with Figure 1 to give a follow-up movement to contact 22. In this embodiment, as in Figure 1, the contacts 22 and 88 are continually moved into and out of engagement with each other with the average time of engagement varying with the changes in the temperature of the furnace.

Energization of the solenoid 85 serves to move core 89 downwardly against the force of spring 90. This brings contact 61A into engagement with contact 62 to energize motor 64 for rotation in a direction to open the control valve 3 and let more of the heating fluid flow through pipe 2 to the furnace. This same operation of the motor will move lever 90 clockwise to increase the tension of spring 90 and separate contacts 61A and 62. Thus the valve 3 will be positioned in accordance with the value of the condition.

Condenser 86 serves to iron out the impulses of current supplied to the solenoids from the electronic tube 79.

In Figure 4 there is shown a modified form of circuit for controlling the motor 64 that is to be used with the electronic amplifier of Figure 3. In this figure there is shown a balanced bridge, two opposite legs of which consist of variable resistances 92 and 93. These resistances may take the form of lamps, in which case the filaments may desirably be made of carbon. In this case as more or less current is passed through the lamps their resistance will be changed to unbalance the bridge. A third arm of the bridge consists of a fixed inductance 94 while the fourth arm of the bridge consists of a variable inductance 95, the inductance of which is changed to rebalance the bridge upon the occurrence of an unbalance thereof.

The bridge network is supplied with current, varying in accordance with the temperature being measured, from the electronic amplifier of Figure 3 through wires 77 and 87. These wires are connected to the transformer secondary and the plate 83 of tube 79 respectively as shown in Figure 2. Inserted in the wire 87 is the solenoid coil 84 which is shunted by the condenser 86.

The unbalance of the bridge network is detected by a galvanometer 96 whose deflecting pointer is provided with a contact 61B. This contact is adapted, upon unbalance of the bridge, to be brought into engagement with one of contacts 62 or 63 to energize motor 64. The motor, as in the previously described embodiments, serves to adjust the control valve 3. Motor 64, in this case, also adjusts a core 97 of the variable inductance 95.

Upon the occurrence of a change in temperature of the furnace 1 the contacts 22 and 88 are brought into engagement in a manner already described. This acting through the electronic amplifier serves to close a circuit which includes wires 87 and 88 and those parts connected thereto. This serves to energize solenoid 84 in a manner previously described to give a follow-up movement to the contact 22. Simultaneously current is supplied to the bridge circuit in an amount proportional to the temperature change to light the lamps 92 and 93. Due to the type of filaments that are used in the lamps their resistance will change correspondingly and the bridge will be unbalanced. This unbalance will be detected by galvanometer 96, causing the latter to deflect to bring contact 61B into engagement with either contact 62 or 63. The motor 64 will, therefore, be driven to readjust the control valve 3 and will simultaneously shift the core 96 of the inductance 95 to rebalance the bridge circuit and thereby stop the adjustment of the valve 3 when it is opened the proper amount.

In Figure 5 there is disclosed another embodiment of the invention in which a solenoid energized from an electronic amplifier is used to give the follow-up movement of the contact 22 directly and in which manual reset is provided. An electronic amplifier generally similar to that of Figure 3 is used and an electrical relay circuit specifically different from that of Figure 3 or Figure 4 is used to control motor 64.

The contact moving mechanism is shown diagrammatically in Figure 5 but various parts have been given the same reference numerals that they had in previously described figures. The levers 50 and 47 are biased to the left by a spring 98. In this manner a pin 99 of the lever 47 is maintained in engagement with one edge of a wedge shaped member 100. This member is mounted on a lever 101 so that it can be raised or lowered to vary the distance between the pin 99 and a second pin 102 on one end of a stem 103 of a solenoid armature 104. Cooperating with the armature 104 is a solenoid 105 through the center of which the stem 103 projects. Attached to the right end of the solenoid is a guideway 106 that receives an enlargement 107 on the stem to guide the same as it reciprocates. Surrounding the stem 103 and received between the armature 104 and the left end of the solenoid is a spring 108 which acts to normally bias the armature and its associated mechanism to the left. The force of the spring is overcome to move the armature to the right when the solenoid 105 is energized. A protecting case 109 surrounds the armature and spring.

The amplifier in this embodiment comprises an electronic tube 110 having elements similar to those found in tube 79 of Figure 3 plus a rectifier section. The cathode 111 is connected directly to one side of the line and the plate 112 is connected to one terminal of solenoid 105, whose other terminal is connected to the other side of the line. A condenser 113 is shunted across the solenoid. The amplifying section of the tube is also provided with a screen grid 114 that is connected to the plate and a control grid 115 that is connected by a wire 116 through a pair of current limiting resistors A and B to a contact 117 that cooperates with contact 22. A condenser 118 is shunted across the two contacts 22 and 117. The rectifier section of tube 110 is provided with a cathode 119 that is connected to one side of the line, and a plate 120 that is connected through a condenser 121 to the other side of the line. Paralleling the condenser 121 is a resistance C that is connected between the resistances A and B in wire 116 and to one terminal of the condenser 118.

The relay that is used to control motor 64 in this embodiment is actuated from the stem 103 of the armature 104 in response to movement thereof. This movement operates a pilot relay that in turn operates a load relay in the circuit of motor 64.

The left end of stem 103 carries a contact 122 that is moved therewith between a stationary conductor 123 and a variable resistance 124. The ends of the resistance are connected in a closed circuit to the ends of a similar resistance 125 and the connecting wires have in them pilot relay coils 126 and 127 respectively. To energize the circuit the conductor 123 is connected to a transformer secondary 128 and from there to a movable contact 129 that bears against the resistance 125. These parts in effect form a bridge circuit which upon movement of contact 122 will cause more or less current to flow through one of the pilot coils 126 or 127 than through the other. The coils are provided with a responsive mechanism (not shown) that operates to throw a switch arm 130 into engagement with one of the contacts 131 or 132 to control the energization of a pair of load relay coils 133 and 134. These coils are energized upon actuation of the switch 130 by a transformer secondary winding 135. The winding 135 along with winding 128 forms part of a transformer, the primary winding 136 of which is connected directly to the line. As one or the other of the coils 133 or 134 is energized a core that is mechanically connected to a switch arm 61C is moved to bring this arm into engagement with one of the contacts 62 or 63. Such operation energizes the control motor 64 for rotation in the proper direction, to adjust valve 3 and simultaneously shifts contact 129 along resistance 125 in a direction to produce equal energization of the coils 126 and 127. This operation opens the various switches and stops rotation of motor 64.

In the operation of the embodiment of Figure 5 on one half cycle of the current supplied through lines L¹ and L² electrons can flow through the rectifier section of the tube 101 from the cathode 119 to plate 120 to charge condenser 121. The subsequent discharge of the condenser 121 through resistance C serves to place a charge on the condenser 118. Since the cathode 111 is grounded through the contact 22, the charging of condenser 118 serves to make grid 115 negative with respect to cathode 111. Therefore on the next half cycle if contacts 22 and 117 are not in engagement with each other no current can flow in the plate circuit of the tube. If, however, due to the increase in the temperature of the furnace the contact 22 is brought into engagement with contact 117 the condenser 118 will discharge through the contacts to bring the potential of the control grid 115 substantially to the value of that of the cathode 111. Current can, therefore, flow through the tube, and a circuit will be completed from line L² cathode 111, plate 112, solenoid 105 back to line L¹. The solenoid will, therefore, be energized in response to an increase in temperature of the furnace 1. The condenser 113 serves to smooth out the ripples of the currents supplied by the vacuum tube 110.

Energization of solenoid 105 serves two purposes. First the armature 104 along with its stem 103 is moved to the right against the force of spring 108 and operates through the lever system to separate contacts 22 and 117 in a follow-up movement. This same movement of the armature serves to shift contact 122 to the right along resistance 124 to unbalance the circuit including the resistance 125 and the pilot relay coils 126 and 127. The relay coil 126 will, therefore, be energized to a greater extent than coil 127 and switch arm 130 will be moved upwardly into engagement with contact 131. This serves to energize the load relay coil 133 so that its armature will move the switch arm 61C to the left into engagement with contact 63. This energizes the motor 64 for rotation in a direction to close the valve 3 and reduce the supply of heating fluid to the furnace so that the temperature will return to normal. Rotation of a motor 64 will also shift the contact 125 to the left to rebalance the bridge circuit so that coils 126 and 127 will be energized the same amount. At the time the energization of these coils is equal the switches 130 and 61C will be opened to stop the rotation of the motor. The valve 3 at this time will be opened an amount sufficient to supply enough heating fluid to maintain the temperature of the furnace constant. If the increase in temperature was due to a decrease in load the operation of the system disclosed will probably not bring the temperature back to the control point since the system is provided with only a follow-up action. In order to compensate for the change in load in the furnace the member 100 may be shifted to vary the distance between pins 102 and 99. This, in effect, changes the length of armature stem 103 and resets the contact 22 to a new position for the new load on the furnace. With this embodiment, as in the previous embodiments of the invention, the contact 22 will be continuously moved between opened and closed positions and a change in the value of the condition varies the average time that the contact is out of or in engagement with the contact 117.

It will be seen that this embodiment of the invention uses the solenoid which is energized from the vacuum tube to directly give a follow-up movement to the movable contact. This solenoid also operates the relay circuit of the system so that the control motor will be run in the proper direction to adjust the valve. At times when automatic reset is not necessary to the system it may be found advisable to use this type of mechanism rather than that disclosed in the previously described figures.

The embodiment of the invention disclosed in Figure 6 provides an on-off control; that is one in which the control valve is opened when the condition is low and the control valve is closed when the condition is high. In this embodiment the lever 26 is mounted on a support 137 and is provided with a projection 26A that acts through a movable pin 138 to shift the contact 22. As the pin 138 is raised and lowered more or less movement of the link 8 is required to separate the contacts 22 and 117. The amplifier circuit used with this embodiment of this invention is identical with that of Figure 5 except that the solenoid 105, in this case, is used to move a switch arm 139 against a stationary contact 140 to energize a solenoid 141. This solenoid is the actuating member of a valve 142 in the fuel supply line 2, the valve being normally closed by a spring and opened by the solenoid when the latter is energized.

In the operation of this embodiment the link 8 is connected to the left end of the lever 26 so that an upward movement of this link in response to a decrease in the temperature of the furnace 1 will permit the contact 22 to move into engagement with contact 117. This, in the manner previously described, will cause energization of the solenoid 105 through the electronic tube 110 to close contacts 139 and 140. Upon closure of this contact the solenoid 141 is energized to open the valve 142 which valve remains open until such time as the temperature increases above normal. Thereafter the instrument will operate to lower link 8 and separate contacts 22 and 117. This operation will permit a current flow through the amplifier section of the tube 110 so that the solenoid 105 will be deenergized. Consequently the switch 139 will open, solenoid 141 will be deenergized, and the valve 142 will close under its normal spring bias. The valve will remain closed until such time as the temperature decreases below the control point.

The embodiment of the invention shown in Figure 7 has follow-up and manual reset such as was provided in the embodiment of Figure 5. In this case, however, the follow-up is obtained by means of a reversible motor which is energized for rotation in the proper direction in response to changes in the temperature of the furnace. Operation of this motor also acts through a relay circuit similar to the one shown in Figure 5 to energize the control motor for operation in the proper direction to readjust the control valve 3.

In this embodiment, movement of the contact 22 into engagement with a contact 143 will energize a solenoid 144 by completing a circuit between these two contacts, the solenoid and a source of electrical energy 145. Energization of the solenoid serves to move a switch arm 146 downwardly against the bias of a spring 147 into engagement with a contact 148. A circuit is closed when these two contacts engage through the contacts and a transformer secondary winding 149 to the field 150 of a reversible motor 151. Normally when the solenoid 144 is not energized the switch arm 146 will be in engagement with a contact 152 to energize through a similar circuit motor field 153.

Energization of the motor 151 will produce rotation of a pinion 154 that is on the motor shaft to accomplish two purposes. First, this pinion will rotate in a direction to shift a rod 155 having rack teeth formed on it and in mesh with the teeth of the pinion in a direction to give a follow-up movement to the contact 22. The second operation of this pinion 154 is to move the rod 155 so that a resistance 156 wound on its left end will be moved relative to a contact 157. This resistance forms with a second resistance 158, a bridge circuit that has in its arms relay coils 159 and 160. The bridge is energized from the contact 157 through a transformer secondary winding 161 to another movable contact 162, which is movable across the resistance 158. The transformer windings 149 and 161 are energized from a primary winding 163 that is connected directly to the line. When one of the relay coils 159 or 160 becomes more energized than the other due to movement of rod 155 it will operate to move the contact 61D into engagement with either contact 62 or 63 to energize motor 64 for rotation. This motor adjusts the opening of the control valve 3 and simultaneously moves contact 162 in the proper direction to rebalance the bridge circuit.

In the operation of this embodiment an increase in the temperature of the furnace 1 will cause a downward movement of the link 8 and permit contact 22 to engage contact 143. This causes energization of the solenoid 144 to close contacts 146 and 148. The motor field 150 of the motor 151 is, therefore, energized to rotate the motor in a direction to move pinion 154 clockwise. This pinion shifts rod 155 to the right to give a follow-up movement to the contact 22. At the same time the resistance 156 is also shifted to the right to unbalance the bridge circuit in a direction to increase the energization of relay coil 159 with respect to coil 160. The contact 61D will, therefore, be moved into engagement with contact 63 to energize motor 64 for rotation in a direction to close the valve 3. Simultaneously the contact 162 will be shifted to the right along resistance 158 to equalize the energization of coils 159 and 160 and thereby open the control switch for motor 64.

The contact 22 in this embodiment is also continually moved into and out of engagement with the stationary contact 143 as was done in some of the previously described embodiments. It should be noted that in each embodiment of the invention the movement of contact 22 is very small and that the movement of the parts of the various control systems which produce that movement is negligible. This, however, keeps the instrument in a nascent state so that it can instantly respond to any changes in temperature. Such operation produces a very sensitive control instrument.

From the above description it will be seen that I have invented a control system which is instantly responsive to changes in the value of a condition being measured and which can operate to immediately correct that condition by changing the setting of the control instrumentalities the proper amount to correspond to the condition change. The instrument operates with a very low value of voltage on the control contacts and the circuit is completed through a very high impedance so that no sparking may occur at that point. This low voltage is sufficiently amplified to actuate the necessary control mechanism.

Having now described this invention, what I claim as new and desire to secure by Letters Patent is:

1. In a control instrument, the combination of a pair of electrical contacts, means tending at all times to move said contacts in one direction relative to each other, means operated upon engagement of said contacts to move them in an opposite direction relative to each other against the force of said first means, an element movable in response to variations in the value of a condition, mechanism operated by said element to move one of said contacts relative to the other independently of said means to move said contacts into engagement with each other or out of engagement with each other depending upon variations in the value of said condition in either direction from a predetermined value, and means operated in response to engagement and disengagement of said contacts to control said condition.

2. In a control instrument, the combination of a pair of electrical contacts, resilient means tending to at all times move one of said contacts in one direction relative to the other, electrical means operative upon engagement of said contacts to move said one of the contacts in the opposite direction relative to the other against the force of said resilient means, an element movable in response to variations in the value of a condition, mechanism operated by said element to move one of said contacts into or out of engagement with the other independently of said first two means depending upon whether the value of the condition is above or below a predetermined value, means operated upon closure of said contacts by said element to operate said electrical means, and means operated in one direction or the other as said contacts are closed or opened to control the value of said condition.

3. In a control instrument, the combination of an element movable to positions depending upon the value of a condition, a pair of electrical contacts, mechanism operated by said element to move said contacts into or out of engagement with each other depending upon whether the value of said condition is above or below a predetermined value, fluid operated means acting on said mechanism independently of said element to move said contacts into or out of engagement with each other, resilient means and electrical means acting in opposition to each other and on said fluid operated means to cause the latter to move the contacts, second electrical means operative to control a condition varying medium, and means to simultaneously energize said two electrical means upon closure of the contacts.

4. In a control system, a pair of cooperating contacts, a first means tending at all times to maintain one contact in engagement with the other, second means operative at times to oppose said first means and separate said contacts, means operated upon closure of said contacts to energize said second means whereby the same will open the contacts, an element movable in response to variations in a condition, mechanism operated by said element to move one of said contacts in a direction to supplement the action of said first means or said second means depending upon whether the value of the condition is above or below a predetermined value, and control means for said condition operated to change the value of the condition in one direction or the opposite direction by the opening and closing of said contacts.

5. In a control system, a pair of cooperating contacts one of which is movable, a first means tending at all times to open said contacts, a second means opposing said first means and adapted at times to close said contacts, fluid operated mechanism acting between said first and second means and said movable contact to move the latter by operation of the former, said mechanism giving an independent movement to the contact depending upon the actuation of said first and second means, an element movable in response to variations in a condition, connecting means between said element, said mechanism, and said movable contact whereby said element will move said contact to supplement movement imparted thereto by said first or second means depending upon whether the condition is above or below a predetermined value, and an electrical circuit including said contacts and said second means to operate the latter when said contacts close.

6. In a control instrument, the combination of a stationary contact and a movable contact, means responsive to variations in the value of a condition to move said movable contact relative to said stationary contact in a direction depending upon the direction of change of the condition, fluid operated means to give a follow-up movement to said movable contact in response to a movement thereof by said responsive means, a plurality of motive means operable in opposite directions, an electronic control circuit adapted to regulate the operation of said motive means in said opposite directions, said circuit being connected with said contacts and controlled to operate said motive means in opposite directions by engagement and disengagement of the same, means actuated by one of said motive means to operate the fluid means, and means operated by another of said motive means to control the condition.

7. In a control instrument, the combination of a stationary contact, a movable contact, an element movable in response to variations in the value of a condition to move said movable contact into or out of engagement with said stationary contact, an electric power supplying member, an electronic control circuit to control the operation of said member, said circuit including a vacuum tube including a plate, cathode and a grid, said member being in the plate circuit, a condenser in a circuit between the grid and cathode, means to supply direct current to charge said condenser to supply a negative bias to said grid, connections between the terminals of said condenser and said contacts whereby upon closure of said contacts said condenser will be discharged to permit flow of current in the plate circuit and operation of said member, and condition controlling means regulated through operation of said member.

8. In a control instrument, an element movable in response to variations in the value of a condition, a control member operated in one sense or an opposite sense to control said condition, means to operate said member in response to movements of said element comprising a vacuum tube having a plate, a grid and a cathode, means to supply power to said tube, a plate circuit comprising said source of power, said cathode, said plate and said member, a grid circuit comprising said grid, a condenser and said cathode, means to supply direct current to charge said condenser in a manner to place a negative bias on said grid whereby no current can flow in said plate circuit, a contact connected to each side of said condenser, means controlled by said element to engage or disengage said contacts whereby when said contacts are closed said condenser may be discharged to permit current to flow in said plate circuit.

9. In a control instrument, a plurality of interconnected electric control circuits, a single pair of contacts one of which is movable, an element movable in response to variations in the value of a condition, mechanism operated by said element to move said movable contact into or out of engagement with the other of said pair of contacts depending upon whether the condition is above or below a predetermined value, means acting through said mechanism to give normally a follow-up movement in one direction to said movable contact but operable to give said movable contact a follow-up movement in the opposite direction, motor operated means normally tending to adjust the value of the condition in one direction, but operable to adjust the value of the condition in the opposite direction, one of said control circuits operating to control said motor to adjust the condition in the said opposite direction, another of said control circuits controlling said means giving the follow-up movement, to give a follow-up movement in said opposite direction and means operated upon engagement and disengagement of said pair of contacts to control the operation of said electrical control circuits.

10. In a control instrument, the combination of a pair of contacts, one of which is movable, responsive means to move said contacts into and out of engagement with each other in response to variations in the value of a condition, means normally acting to adjust said condition in one direction but operable to adjust said conditon in the opposite direction, fluid actuated follow-up means normally acting to give said movable contact a follow-up movement in one direction but operable to give a follow-up movement in the opposite direction, an electric relay circuit opened and closed by said contacts, and means operated upon closure of said relay circuit, to operate said follow-up means to give said movable contact a follow-up movement in said opposite direction, and to operate said means to adjust said condition in said opposite direction.

HARRY S. JONES.